May 13, 1969  C. MACKIEWICZ  3,444,345
ELECTRICAL WIRING DEVICE WITH POSITIVE LOCKING COVER
Filed June 29, 1967  Sheet 1 of 2
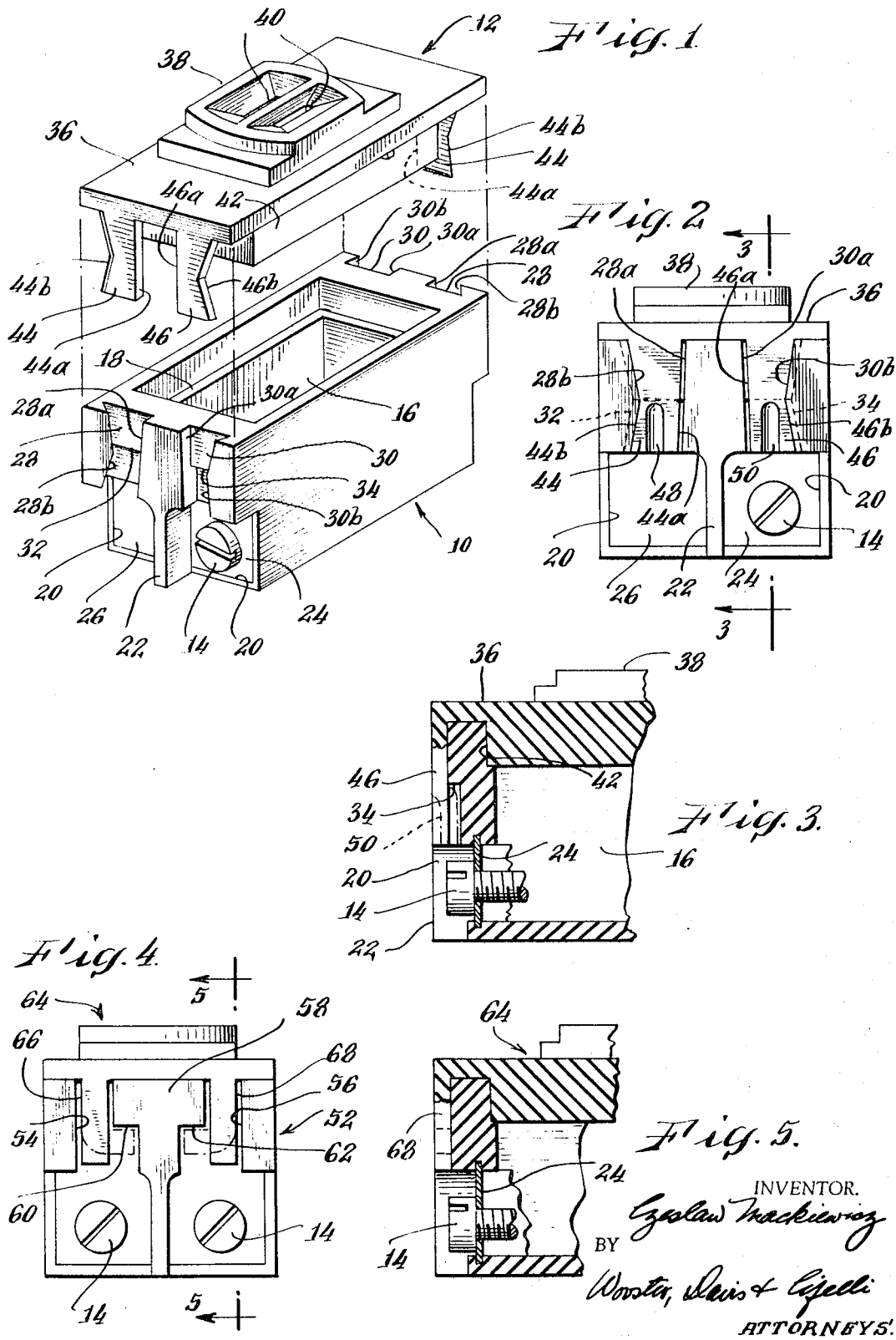
INVENTOR.
Czeslaw Mackiewicz
BY
Wooster, Davis & Cifelli
ATTORNEYS.

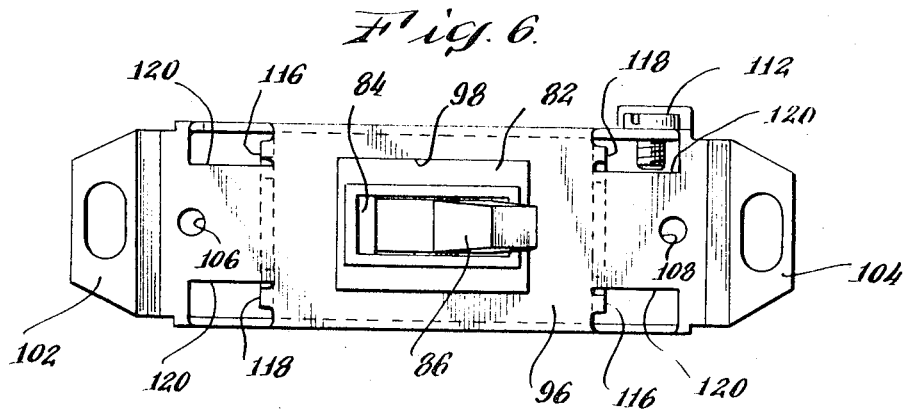
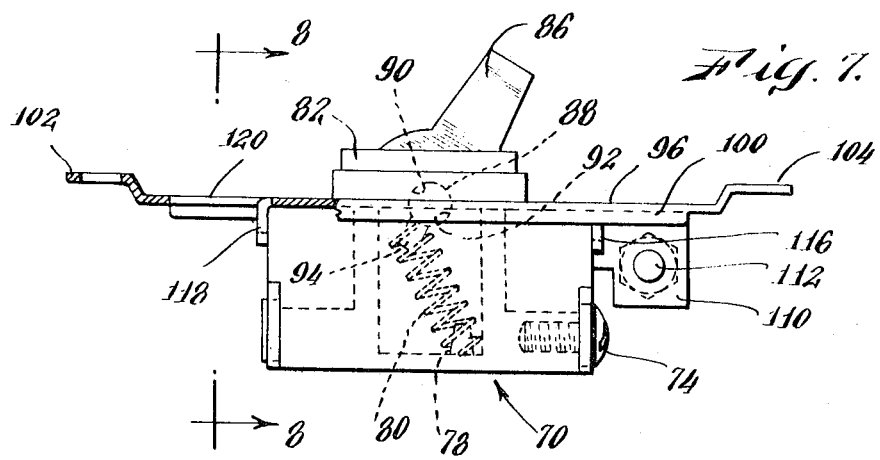
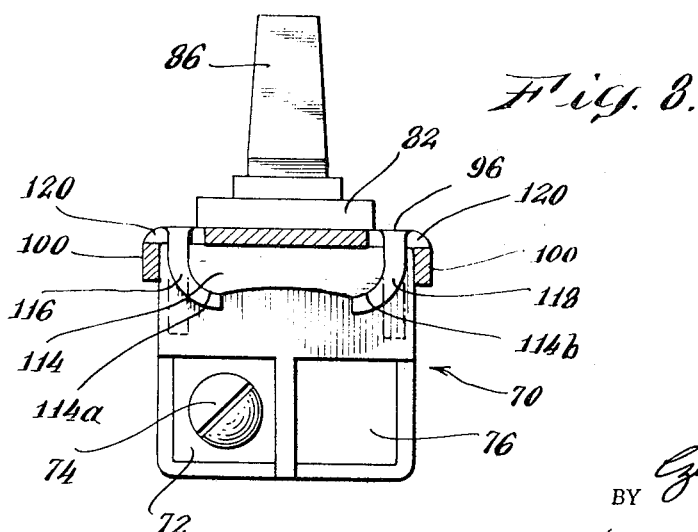

United States Patent Office 3,444,345
Patented May 13, 1969

3,444,345
ELECTRICAL WIRING DEVICE WITH POSITIVE LOCKING COVER
Czeslaw Mackiewicz, Trumbull, Conn., assignor to Harvey Hubbell, Incorporated, Bridgeport, Conn., a corporation of Connecticut
Filed June 29, 1967, Ser. No. 650,116
Int. Cl. H01h 9/02
U.S. Cl. 200—168                                11 Claims

ABSTRACT OF THE DISCLOSURE

This invention pertains to an electrical wiring device of the interchangeable type. The housing of the device is formed with a shoulder at each end. The cover includes a locking prong which extends downwardly from each end and, after assembling the cover to the housing, is deformed beneath the shoulder to give a positive locking effect.

Background of the invention

In my copending patent application Ser. No. 431,665 filed Feb. 10, 1965, now Patent No. 3,335,900, there is disclosed and claimed an electrical wiring device with a snap action non-metallic cover having resilient prongs designed to snap into suitable recesses in the housing member. Such a construction is applicable to and effective for any type of wiring device including, but not limited to, pilot lights, receptacles, and switches. However, some positive locking between the cover and housing in addition to that provided by such a construction may be desirable when the device is employed for certain applications and under certain conditions. For example, some types of toggle switches employ a compression spring disposed between the toggle and housing. This spring exerts a continual force which tends to separate the cover from the housing. Also, in the case of receptacles, when they are in exposed locations, caps plugged into them are often subjected to sideward forces tending to cause separation of the receptacle body components. The same tendency may result from repeated plugging and unplugging of the cap relative to the receptacle body.

Accordingly, it is the object of the present invention to provide a body and cover means for an electrical wiring device wherein the elements are assembled by a positive locking arrangement.

Summary of the invention

The object of the present invention is achieved by means of an electrical wiring device having a two part body. One part is a housing having an open top and two ends, each of the ends including a locking shoulder which is spaced downwardly from the open top. A housing cover is also provided which has at least one deformable locking prong which extends downwardly from each end of the cover adjacent the shoulder. These prongs are so positioned that they may be permanently deformed to lockingly engage the corresponding shoulders to thereby retain the cover on the housing.

Brief description of the drawing

The present invention may be best understood by reference to the attached drawings wherein:

FIG. 1 is a perspective view of a wiring device housing and cover prior to assembly;

FIG. 2 is an end view of the wiring device housing and cover of FIG. 1 shown in their assembled condition;

FIG. 3 is a partial cross section taken substantially along 3—3 of FIG. 2;

FIG. 4 is a view similar to FIG. 2 showing a modified form of the invention;

FIG. 5 is a partial cross section taken substantially along the line 5—5 of FIG. 4;

FIG. 6 is a top view of still another modification of the invention for housing a toggle switch;

FIG. 7 is a side view of the device of FIG. 6, partially broken away to illustrate its construction; and FIG. 8 is an enlarged cross section taken substantially along the line 8—8 of FIG. 7.

Description of the preferred embodiments

FIGS. 1–3 illustrate an interchangeable wiring device, for use as an electrical receptacle, including a housing 10 and cover 12. Binding screws 14 are mounted in the housing in accordance with the usual practice to function as detachable terminals for conductor wires. In FIG. 1 the wiring device is illustrated with the cover 12 separated from the housing 10. As the specific electrical mechanism forms no part of this invention, it is not illustrated herein. With particular reference to FIG. 1 it will be noted that housing 10 is substantially box shaped and of rectangular cross section. The housing 10 is formed of a rigid insulating material such as Bakelite and defines an internal chamber 16 which normally contains the female electrical contacts. The upper portion of switching chamber 16 is slightly larger than the lower portion so as to define an inwardly extending ledge 18 against which a portion of cover 12 may be seated to form a seal. On its outer side, each end wall of the housing 10 is cut away to form a pair of corner recesses 20 separated by a vertical rib 22. Recesses 20 may contain metal terminal plates 24 for carrying the binding screws 14 and making contact with the internal wiring assembly. Alternatively, the recesses may be closed by suitable insulating plates 26, when not required for wiring purposes. The upper portion of each outer end wall of the housing 10 defines a pair of spaced channels, a left channel 28 and a right channel 30. The two channels in each end wall are mirror images of one another and each includes a straight inner side 28a, 30a and a V-shaped undercut outer side 28b, 30b. The lower portion of the back surface of each of the left and right channels is cut away to form horizontal shoulders 32, 34.

The cover 12 is formed from a single piece of an electrical insulating material that is resilient relative to the housing 10, nylon having been found well suited in practice. The cover 12 includes a flat upper surface 36 and a centrally positioned raised boss 38 which defines the usual slots 40 of an electrical receptacle. A rectangular flange 42 depends from the underside of the cover and is dimensioned so as to fit in the upper portion of chamber 16 and rest against the ledge 18 of housing 10 when assembled. Each end of the cover 12 includes a pair of depending locking prongs, a left locking prong 44 and a right locking prong 46. Each of the prongs is substantially similar in cross section to one of the channels 28, 30. For example, each prong includes a straight inner edge 44a, 46a and a V-shaped outer edge 44b, 46b which is tapered to match the undercut portions of the corresponding channels.

The snap action locking feature disclosed in the aforesaid copending patent application is preserved in the modification of FIGS. 1–3. However, an additional positive locking feature is added when warranted by the particular application, such as use of the wiring device as a receptacle. Thus, the cover 12 may be positioned relative to the housing 10 so that the lower ends of the locking prongs 44, 46 at each end of the cover enter the enlarged entrance portions of corresponding channels 28, 30 of housing 10. As cover 12 is forced further downward, the locking prongs 44, 46 are cammed inwardly against the natural resilience of the nylon until each of the prongs has reached its position of maximum stress with its lower outer corner at the apex of one of the V shaped outer sides 28b, 30b and its lower inner corner is in contact with one of the straight inner sides 28a, 30a, with the lower portions of the prongs under compression and somewhat compressed. During this period of maximum stress, the locking prongs are forced inwardly toward the back surfaces of the channels 28, 30 by virtue of the interlocking relationship between the tapered outer edges of the prongs and the undercut outer sides of the channels. Further advancement of the cover 12 carries the lower end of each locking prong past the apex of the associated V-shaped side to snap into the fully assembled closed position shown in FIGS. 2 and 3. It will be noted from FIG. 2 that each of the locking prongs 44, 46 is now mated with a corresponding one of the channels 28, 30 and that the V-shaped formation provides a locking action which prevents the cover 12 from being removed without exerting sufficient force to deform the nylon prongs. In order to utilize the illustrated embodiment under the stress conditions of an electrical receptacle, a further deformation step may now be accomplished to provide a positive lock after assembly. This is accomplished by utilizing heat staking or ultrasonic deformation to create a deformed locking rib 48, 50 in each of the prongs 44, 46, the deformation being of sufficient extent to force the corresponding rib under one of the shoulders 32, 34. This forms a positive lock which prevents the cover 12 from being loosened from housing 10, even under the repeated stress created by the insertion and removal of an electrical plug or sideward forces against the inserted plug.

It will be noted that one of the advantages of the modification shown in FIGS. 1–3 is that the same molds may be used for manufacturing either the pilot light housing or a receptacle housing, the distinction between the two being that, for use as a receptacle the additional deformation step is employed.

In FIGS. 4 and 5 there is illustrated a further modification which permits the use of simpler and less expensive molds but wherein deformation is required. The construction of this embodiment need not be described in great detail because in many respects it is similar to that of FIGS. 1–3. However, in this arrangement the housing 52 has formed in each end an L-shaped left channel 54 and a mirror immage right channel 56. There is thus formed between the two channels a T shaped divider 58 defining a left locking shoulder 60 and a right locking shoulder 62. The cover 64 employed with the modification of FIGS. 4 and 5 is similar to that employed with the embodiment illustrated in FIGS. 1–3 with the exception of the locking prongs. Both the left locking prong 66 and the right locking prong 68 at each end of the cover are rectangular and, after assembly of the cover 64 to the housing 52, are bent inwardly as shown by the broken lines of FIG. 4 with the aid of heat, so as to provide a positive locking action against the shoulders 60, 62.

In FIGS. 6–8 there is illustrated a modification which is especially designed for a toggle switch application. As has been previously explained, this is a particularly difficult application because the usual toggle switch is actuated by a coil spring which is under constant compression and the force it exerts tends to separate the cover from the housing. In this arrangement, there is the usual housing 70 made of an insulating material and having suitably placed terminal plates 72 and binding screws 74 as well as insulating plates 76 where required. The internal construction of the housing is conventional and includes a fixed stud 78 for receiving the lower end of the actuating spring 80. The switch includes a combination cover including a plastic toggle housing 82 defining a rectangular opening 84 for receiving a usual toggle 86. The molded cylindrical pins 88 of the toggle are retained between matching semicircular openings 90, 92 in toggle housing 82 and the side walls of housing 70. The lower surface of toggle 86 includes a movable stud 94 which extends within the upper end of the actuating spring 80. The toggle housing 82 closes the open top of housing 70 and is held in place by means of a metallic securing plate 96 which also serves as a mounting strap. The securing plate 96 is substantially rectangular and has a central rectangular opening 98 surrounding the toggle housing 82. The securing plate 96 also has downwardly extending sides 100 for laterally positioning the housing 70 and an offset mounting ear 102, 104 at each end. The securing plate 96 also includes tapped holes 106, 108 at each end for receiving the usual mounting screws of a cover plate. The securing plate is also formed with a downwardly extending grounding terminal 110 which is drilled and tapped to receive the usual grounding screw 112.

Referring now to the end view of housing 70 shown in FIG. 8, it will be noted that each end wall of the housing is molded with a shoulder 114 having curved portions 114a, 114b at its outer lower extremities. The securing plate 96 is formed with a left locking prong 116 and a right locking prong 118 at each end. These locking prongs are struck from openings 120 in the securing plate and extend straight downwardly as shown by the broken lines in FIG. 8 when the members are assembled. To complete the assembly, the locking prongs are staked inwardly as illustrated to lie beneath the curved portions 114a, 114b of the shoulders 114. This provides a positive lock for retaining the cover assembly on the housing 70.

The many advantages of this invention will now be apparent to those skilled in the art. It will also be apparent that a number of modifications and variations may be made in this invention without departing from its spirit and scope. Accordingly, the foregoing description is to be construed as illustrated only, rather than limiting.

What I claim as new and desire to secure by Letters Patent of the United States is:

1. A body for an electrical wiring device which comprises: a housing having an open top and a first and a second end, each of said housing ends including a locking shoulder spaced downwardly from said open top; cover means on said housing having a first and a second end; and a locking prong integral with said cover means depending downwardly from each end thereof and permanently deformed beneath its corresponding locking shoulder, whereby said cover means is retained on said housing.

2. The body of claim 1 wherein said locking shoulder is defined by a portion of a locking recess extending to the top edge of its respective housing end.

3. The body of claim 2 wherein first and second locking shoulders are formed in each housing end by similar locking recesses positioned in reversed relationship substantially symmetrically about the vertical centerline of each housing end.

4. The body of claim 3 wherein said locking recesses are of substantially right angular configuration, said locking shoulders being formed by the lower surfaces of the arms of a T-shaped projection formed between said recesses.

5. The body of claim 1 wherein said cover means comprises: a toggle housing closing said open top; and a securing member retaining said toggle housing therein, said locking prongs depending from said securing member.

6. The body of claim 5 wherein said securing member is in the form of a metallic plate having two of said locking prongs at each end of said housing and a central opening enclosing a portion of said toggle housing therein.

7. The body of claim 5 wherein said securing member is in the form of a metallic plate and includes first and second mounting strap portions extending outwardly from said housing.

8. A body for an electrical wiring device which comprises: a housing having an open top and a first and a second end, each of said housing ends defining at least one locking channel extending downwardly from said open top and including a narrowed central portion and an outwardly angled lower portion and including a locking shoulder within said locking channel spaced downwardly from said open top; cover means on said housing having a first and a second end; and a locking prong depending downwardly from each end of said cover means and including a narrowed central portion and an angled lower portion coincident to the angled portion of its corresponding channel when the cover is fully positioned on said housing, said locking prong being permanently deformed beneath its corresponding locking shoulder, whereby said cover means is retained on said housing.

9. The body of claim 8 wherein each of said locking channels includes a substantially straight side and a substantially V-shaped side, said V-shaped side being undercut, and wherein each of said locking prongs includes a tapered side adapted to interlock with the undercut side.

10. The body of claim 8 wherein a portion of said locking prong is deformed inwardly to extend beneath said locking shoulder.

11. An electrical switch body which comprises: an insulating box-like switch housing having an open top and a first and second end, each of said switch housing ends including a locking shoulder spaced downwardly from said open top; a toggle housing closing said open end and including a central boss defining an opening therethrough; a toggle member positioned to extend through said opening and mounted for rotation between said switch housing and said toggle housing; a compression spring positioned between said toggle member and the interior of said switch housing; and a metallic plate-like securing member defining a central opening enclosing said toggle housing and having first and second locking prongs integral therewith depending downwardly at each end of said switch housing positioned to be permanently deformed beneath a respective locking shoulder, and first and second mounting strap portions extending outwardly from said housing.

References Cited

UNITED STATES PATENTS

| | | |
|---|---|---|
| 2,969,443 | 1/1961 | Barden et al. |
| 3,172,972 | 3/1965 | Schleicher. |
| 3,182,161 | 5/1965 | Winter. |
| 3,242,297 | 3/1966 | Piber. |
| 3,308,260 | 3/1967 | Krieger et al. |
| 3,335,900 | 8/1967 | Mackiewicz. |

ROBERT K. SCHAEFER, *Primary Examiner.*

H. O. JONES, *Assistant Examiner.*

U.S. Cl. X.R.

260—301.2